United States Patent
Jeon et al.

(10) Patent No.: US 8,085,723 B2
(45) Date of Patent: *Dec. 27, 2011

(54) METHOD OF ALLOCATING RESOURCES IN A WIRELESS NETWORK

(75) Inventors: Beom Jin Jeon, Seoul (KR); Hyeon Cheol Cho, Seoul (KR); Taek Soo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/377,378

(22) PCT Filed: Dec. 3, 2007

(86) PCT No.: PCT/KR2007/006197
§ 371 (c)(1),
(2), (4) Date: May 10, 2010

(87) PCT Pub. No.: WO2008/066363
PCT Pub. Date: Jun. 5, 2008

(65) Prior Publication Data
US 2010/0220669 A1  Sep. 2, 2010

Related U.S. Application Data

(60) Provisional application No. 60/868,298, filed on Dec. 1, 2006.

(30) Foreign Application Priority Data

Feb. 12, 2007  (KR) ........................ 10-2007-0014537

(51) Int. Cl.
*H04W 4/00* (2009.01)

(52) U.S. Cl. ........ 370/329; 370/231; 370/235; 370/252; 370/468

(58) Field of Classification Search ................. 370/345, 370/252, 230, 231, 235, 329, 468
See application file for complete search history.

(56) References Cited

U.S. PATENT DOCUMENTS

| | | | |
|---|---|---|---|
| 6,738,363 B1 | 5/2004 | Best et al. | |
| 6,747,959 B1 | 6/2004 | Ho | |
| 2005/0180385 A1 | 8/2005 | Jeong et al. | |
| 2006/0050742 A1 | 3/2006 | Grandhi et al. | |
| 2008/0031136 A1* | 2/2008 | Gavette et al. | 370/235 |
| 2008/0101253 A1* | 5/2008 | Shvodian | 370/252 |
| 2008/0212559 A1* | 9/2008 | Mahesh et al. | 370/345 |
| 2010/0067393 A1* | 3/2010 | Sakimura et al. | 370/252 |
| 2010/0128679 A1* | 5/2010 | Kwon | 370/329 |

FOREIGN PATENT DOCUMENTS

| | | |
|---|---|---|
| CN | 101444066 | 5/2009 |
| EP | 0841763 | 5/1998 |

(Continued)

*Primary Examiner* — Luat Phung

(74) *Attorney, Agent, or Firm* — Lee, Hong, Degerman, Kang & Waimey

(57) ABSTRACT

A method of allocating channel resources in a wireless network is disclosed. The method of allocating instant channel resources in a wireless network includes receiving channel resource scheduling information of a specific superframe from a coordinator of the wireless network, requesting the coordinator to allocate instant channel resources for an unreserved duration of the specific superframe, and receiving an announcement message from the coordinator, the announcement message announcing allocation of the instant channel resources within the unreserved duration of the specific superframe.

6 Claims, 13 Drawing Sheets

FOREIGN PATENT DOCUMENTS

| | | |
|---|---|---|
| EP | 1739902 | 1/2007 |
| JP | 20030179964 | 6/2003 |
| JP | 2009513064 | 3/2009 |
| KR | 1020050003575 | 1/2005 |
| KR | 1020050107293 | 11/2005 |
| WO | 2007137201 | 11/2007 |

* cited by examiner

→ High-rate PHY(HRP)
--→ Low-rate PHY(LRP)

FIG. 10A

| Header/Data Block | | | | | | | | | |
|---|---|---|---|---|---|---|---|---|---|
| 7 | 6 | 5 | 4 | 3 | 2 | 1 | 0 | - | - |
| Information bits | | | | | | | | EOM | ACK |

FIG. 10B

| Header Block | | | | | | | | | |
|---|---|---|---|---|---|---|---|---|---|
| 3 | 2 | 1 | 0 | 3 | 2 | 1 | 0 | - | - |
| Initiator | | | | Destination | | | | EOM | ACK |

METHOD OF ALLOCATING RESOURCES IN A WIRELESS NETWORK

CROSS-REFERENCE TO RELATED APPLICATIONS

This application is a 371 U.S. national stage application of international application PCT/KR2007/006197, filed on Dec. 3, 2007, which claims priority to U.S. Provisional Application No. 60/868,298, filed on Dec. 1, 2006 and Korean Patent Application No. 10-2007-0014537, filed on Feb. 12, 2007, the contents of which are hereby incorporated by reference herein in their entirety.

TECHNICAL FIELD

The present invention relates to a wireless network, and more particularly, to a method of allocating instant channel resources in a wireless network.

BACKGROUND ART

Recently, a number of kinds of networks have been developed and implemented in a real life owing to the development of communication, computer and networking technology. A large-scaled network, such as wire or wireless Internet, which connects the whole world, exists while a small-scaled wire or wireless network exists, which connects digital devices in limited places such as general homes or companies. With the development of various types of networks, various interfacing techniques have been also developed, which connect networks or devices with each other to perform communication between them.

FIG. 1 illustrates an example of a wireless video area network (WVAN) which is a kind of a wireless private access network (WPAN). The WVAN is a network configured between digital devices within a limited place, such as home, within 10 m to ensure throughput of 4.5 Gbps or greater at a bandwidth of about 7 GHz, thereby supporting non-compression transmission of 1080p A/V streams.

FIG. 2 illustrates an example of a structure of superframes used in the WVAN. Referring to FIG. 2, each superframe includes a beacon region to which a beacon is transmitted, a reserved region allocated to a random device by a coordinator in accordance with a request of devices, and an unreserved region where data are transmitted and received between the coordinator and a device or between devices in accordance with a contention based mode without being allocated by the coordinator, wherein each of the regions undergoes time division. The beacon includes timing allocation information in a corresponding superframe and management and control information of WVAN.

The reserved region is used to allow a device, to which a channel time is allocated by the coordinator in accordance with a channel time allocation request of the device, to transmit data to another device. Commands, data streams, asynchronous data, etc. can be transmitted through the reserved region. The unreserved region can be used to transmit control information, MAC command or asynchronous data between the coordinator and the device or between the devices. To avoid data collision between the devices in the unreserved region, a carrier sense multiple access (CSMA) mode or a slotted Aloha mode can be used. The length and the number of reserved regions and unreserved regions in each superframe may depend on superframe and may be controlled by the coordinator.

A specific device in the WVAN transmits a bandwidth request command to the coordinator so that the device can be allocated with channel resources for data transmission. The coordinator checks whether there are channel resources to be allocated to the device. If there are channel resources to be allocated to the device, the coordinator allocates the requested channel resources to the device. At this time, information of the channel resources allocated to the device, i.e., timing allocation information is forwarded to the devices within the WVAN through a beacon which will be transmitted later.

Accordingly, in order that a random device is allocated with channel resources by requesting the coordinator of the channel resources and transmits data by using the allocated channel resources, the device should wait for the time to receive at least next beacon. This method of allocating channel resources may have a problem when instant data transmission is required. In other words, if message exchange between two devices is instantly required, for example, if there is a previously set timing constraint to receive a response message to a message transmitted from a specific device to another device, a problem occurs in that the method of allocating channel resources according to the related art cannot fulfill the timing constraint. In this case, message exchange through a contention interval without allocation of channel resources may be considered. However, since the contention based message exchange may cause collision between devices, a problem occurs in that it is impossible to ensure certainty in message transmission and reception.

DISCLOSURE OF THE INVENTION

Accordingly, the present invention is directed to a method of allocating channel resources in a wireless network, which substantially obviates one or more problems due to limitations and disadvantages of the related art.

An object of the present invention is to provide a method of allocating instant channel resources if necessary in a state that channel resources are already allocated.

Another object of the present invention is to provide a method of allocating channel resources in a wireless network, in which delay in message transmission between a wire network and a wireless network or between two devices can be avoided, whereby desirable communication can be performed.

To achieve these objects and other advantages and in accordance with the purpose of the invention, as embodied and broadly described herein, a method of allocating instant channel resources in a wireless network includes receiving channel resource allocation information of a specific superframe, which includes timing information of at least one reserved duration and at least one unreserved duration, from a coordinator of the wireless network, requesting the coordinator to allocate instant channel resources for an unreserved duration of the specific superframe identified by the channel resource allocation information, and receiving allocation information of the instant channel resources, which are allocated within the unreserved duration of the specific superframe, from the coordinator.

In another aspect of the present invention, a method of allocating instant channel resources in a coordinator of a wireless network includes broadcasting channel resource allocation information of a specific superframe to the wireless network, receiving a first message requesting allocation of instant channel resources for an unreserved duration of the specific superframe from a specific device of the wireless network, and broadcasting a second message to the wireless network, the second message announcing allocation of the instant channel resources within the unreserved duration of the specific superframe.

In still another aspect of the present invention, a method of allocating instant channel resources in a coordinator of a wireless network includes receiving a first message requesting channel resources for transmission or reception of data from at least one device, broadcasting channel resource allocation information of a specific superframe, which is scheduled considering request of channel resources from the at least one device, to the wireless network through a beacon, receiving a second message from a specific device of the wireless network, the second message requesting allocation of instant channel resources for an unreserved duration of the specific superframe, and broadcasting a third message to the wireless network, the third message announcing allocation of the instant channel resources within the unreserved duration of the specific superframe.

Preferably, the wireless network is a wireless video area network (WVAN), and the channel resource allocation information is received by being included in a beacon. The instant channel resource allocation request can be performed through LRP channel of HRP channel and LRP channel which are used in the WVAN. Also, allocation information of the instant channel resources can be received through the LRP channel.

Preferably, the instant channel resources include a first channel resource for transmitting a specific message and a second channel resource for receiving a response message to the specific message. The first channel resource and the second channel resource are successively located or spaced apart from each other at a predetermined interval.

In further still another aspect of the present invention, a method of allocating instant channel resources in a wireless network which performs using a first channel and a second channel includes receiving a beacon, which includes channel resource allocation information of a specific superframe, from a coordinator of the wireless network through the second channel, transmitting a first message to the coordinator through the second channel, the first message requesting allocation of instant channel resources which include a predetermined bandwidth on at least one of the first channel and the second channel within an unreserved duration of the specific superframe identified by the channel resource allocation information, and receiving allocation information of instant channel resources, which are allocated within the unreserved duration of the specific superframe, from the coordinator through the second channel.

In further still another aspect of the present invention, a method of forwarding a message in a first interface device connected with a source device includes receiving a first message from the source device, the first message being transmitted to a destination device, allocating instant channel resources within a corresponding superframe from a coordinator to receive a response message to the first message from a second interface device connected with the destination device, transmitting a second message, which includes the first message, to the second interface device, receiving a response message to the second message from the second interface device through the allocated instant channel resources, and transmitting the response message to the first message to the source device.

The allocating step of instant channel resources includes transmitting an instant channel resource allocation request message to the coordinator of the wireless network, and receiving an instant channel resource allocation announcement message from the coordinator. Preferably, the second message is broadcasted to the wireless network. Preferably, the instant channel resource allocation request message and the instant channel resource allocation announcement message are transmitted through the LRP channel. The first message is a consumer electronics control (CEC) message or a vendor specific data. The response message to the first message is an acknowledgement (ACK) signal.

Preferably, the wireless network is a wireless video area network (WVAN), and the channel resource scheduling information is received by being included in a beacon. The instant channel resource allocation request and reception of the announcement message can be performed through the LRP channel.

BRIEF DESCRIPTION OF THE DRAWINGS

FIG. 10A illustrates a data format of a consumer electronics control (CEC) message used in HDMI system;

FIG. 10B illustrates a data format of a header block of a CEC message;

BEST MODE FOR CARRYING OUT THE INVENTION

Hereinafter, structures, operations, and other features of the present invention will be understood readily by the embodiments of the present invention, examples of which are illustrated in the accompanying drawings.

A WVAN is a wireless network configured between digital devices within a limited place, such as home, within 10 m to ensure throughput of 4.5 Gbps or greater at a bandwidth of about 7 GHz, thereby supporting non-compression transmission of 1080p A/V streams. The WVAN supports physical layers, i.e., a high-rate physical (HRP) layer and a low-rate physical (LRP) layer. The HRP layer is a physical layer which supports a data transmission speed of 1 Gb/s or greater while the LRP layer is a physical layer which supports a data transmission speed of several Mb/s. The HRP layer is highly directional, and is used to transmit isochronous data streams, asynchronous data, MAC command, and A/V control data through unicast connection. The LRP layer supports a directional or omni-directional mode, and is used to transmit a beacon, asynchronous data, and MAC command through unicast or broadcast.

Figure 1:
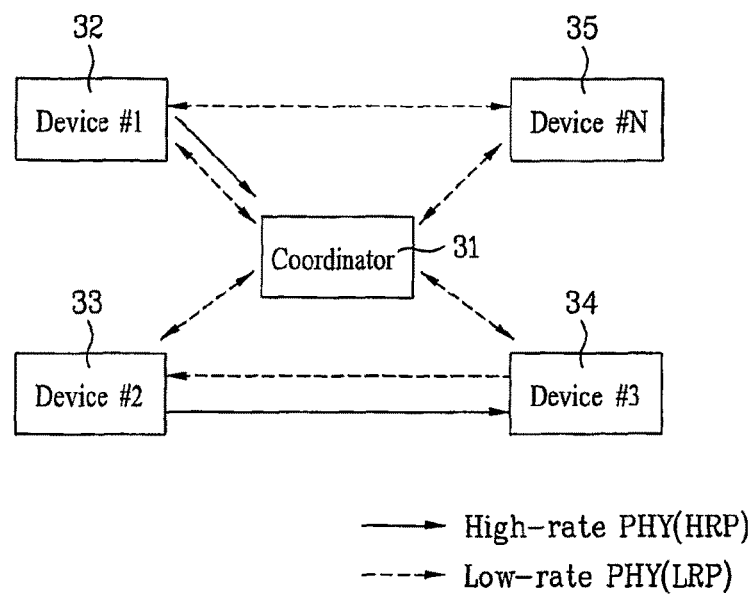
FIG. 1 illustrates a configuration example of WPAN.
Figure 2:
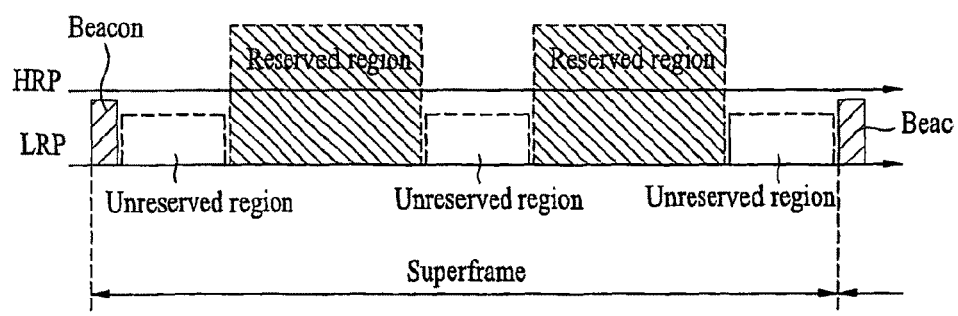
FIG. 2 illustrates an example of a structure of superframes used in WVAN.
Figure 3:
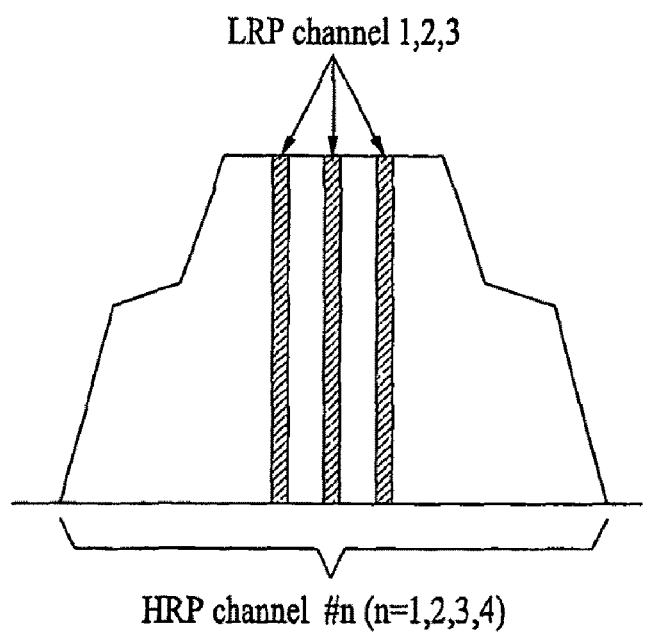
FIG. 3 illustrates a frequency band of HRP channels and LRP channels used in WVAN.

FIG. 3 illustrates a frequency band of HRP channels and LRP channels used in the WVAN. The HRP layer uses four channels of a bandwidth of 2.0 GHz in a band of 57-66 GHz, and the LRP uses three channels of a bandwidth of 92 MHz. As shown in FIG. 3, the HRP channels and the LRP channels commonly use a frequency band and are used respectively by a time divisional multiplexing (TDMA) mode.

Figure 4:
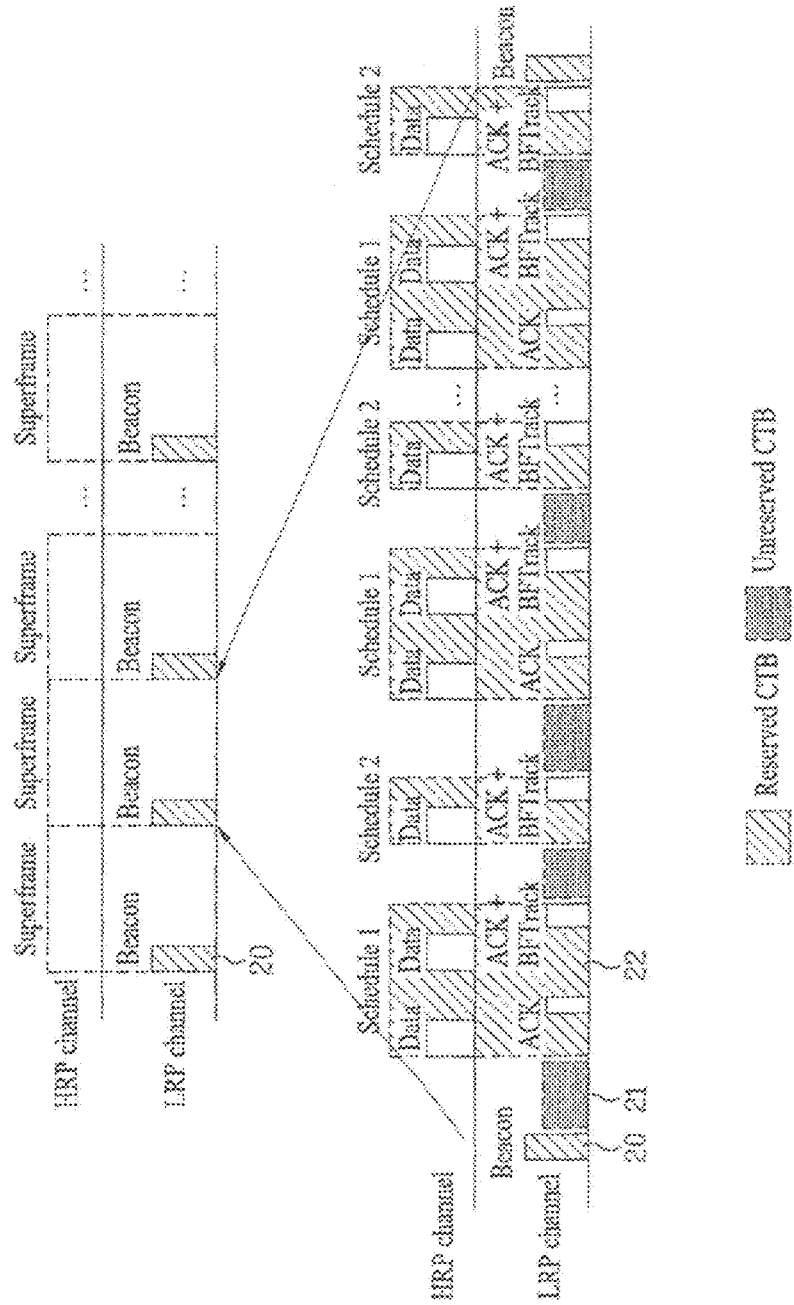
FIG. 4 illustrates an example of a structure of superframes used in WVAN.

FIG. 4 illustrates an example of a structure of superframes used in the WVAN. Referring to FIG. 4, each superframe includes a beacon region to which a beacon is transmitted, a reserved channel time block (CTB) region, and an unreserved channel time block region. The beacon is periodically transmitted by the coordinator to identify a start part of each superframe. The beacon includes scheduled timing information and management and control information of the WVAN. As described above, a specific device in the WVAN transmits a bandwidth request command to the coordinator so that the device can be allocated with channel resources for data transmission. The coordinator checks whether there are channel resources to be allocated to the device. If there are channel resources to be allocated to the device, the coordinator broadcasts information of channel resources allocated to the device, i.e., timing allocation information to the devices within the WVAN through a beacon which will be transmitted later. Each device can perform data exchange in the network through timing information and management/control information included in the beacon.

The reserved CTB region is used to allow a device, to which a channel time is allocated by the coordinator in accordance with a channel time allocation request of the device, to transmit data to another device. Commands, data streams, asynchronous data, etc. can be transmitted through the reserved CTB region. If a specific device transmits data to another device through the reserved CTB region, the HRP channels can be used. If a device which receives data transmits an acknowledgement or negative acknowledgement (ACK/NACK) signal in response to the received data, the LRP channels can be used.

The unreserved CTB region can be used to transmit control information, MAC command or asynchronous data between the coordinator and the device or between the devices. To avoid data collision between the devices in the unreserved CTB region, a carrier sense multiple access (CSMA) mode or a slotted Aloha mode can be used. In the unreserved CTB region, data can be transmitted through the LRP channels only. If there are provided a lot of commands or control information to be transmitted, a reserved region may be set in the LRP channels. The length and the number of reserved regions and unreserved regions in each superframe may depend on superframe and may be controlled by the coordinator. Although not shown in FIG. 4, a contention-based control period (CBCP) may be located next to the beacon to transmit instant control/management message. The length of the CBCP is set so as not to exceed a given threshold value mMAXCBCPLen.

Figure 5:
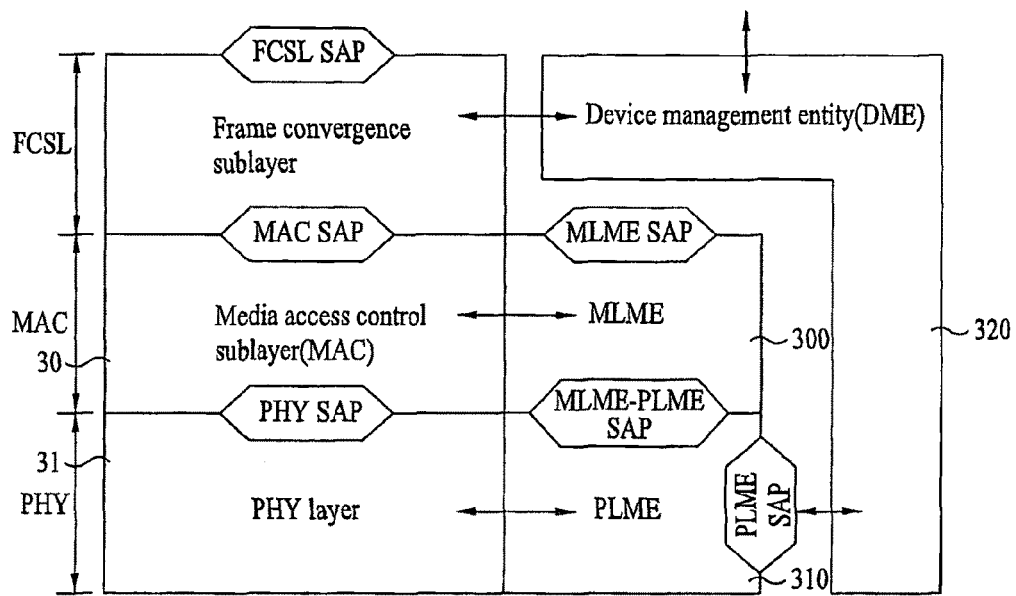
FIG. 5 illustrates an example of a structure of a protocol layer implemented in a device of WVAN.

FIG. 5 illustrates a structure of a protocol layer implemented in a device of the WVAN. Referring to FIG. 5, a communication module of each device included in the WVAN can be divided into at least two layers depending on its function. In general, the communication module includes a PHY layer 31 and a MAC layer 30. The communication module includes entities which manage each layer, wherein a MAC layer management entity (MLME) 300 manages the MAC layer and a PHY layer management entity (PLME) 310 manages the PHY layer. Also, the communication module further includes a device management entity (DME) 320 which collects state information of each device and serves as a control interface between a host and a radio device.

Figure 6:
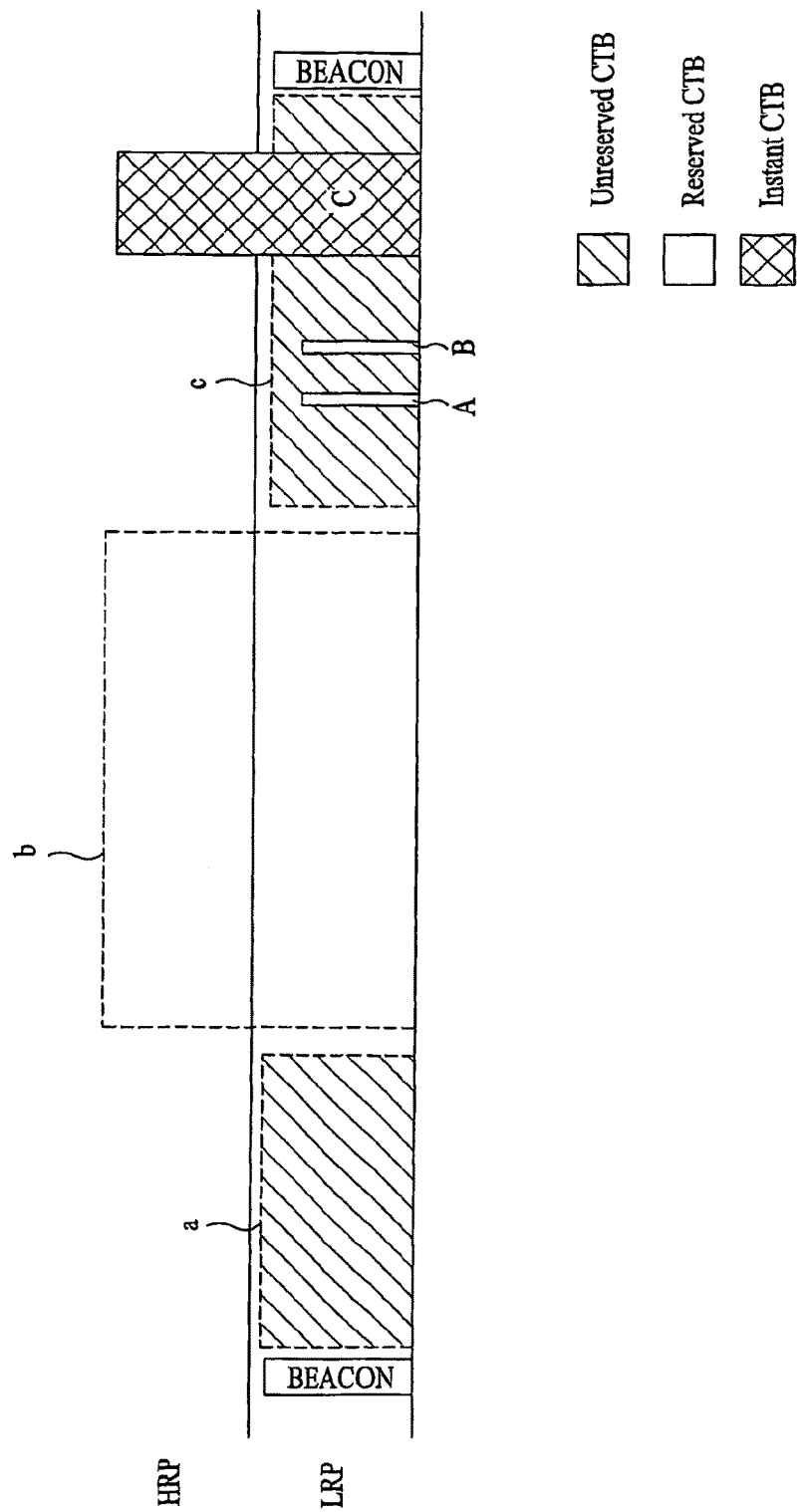
FIG. 6 illustrates an example of a structure of superframes according to one embodiment of the present invention.

FIG. 6 illustrates an example of a structure of superframes according to the embodiment of the present invention.

One superframe in the WVAN includes a beacon region, at least one reserved CTB region, and at least one unreserved CTB region. In FIG. 6, a superframe first scheduled by the coordinator includes two unreserved CTB regions (regions 'a' and 'c') and one reserved CTB region (region 'b'). Detailed timing information of the unreserved CTB regions and the reserved CTB region is included in a beacon located at a starting part of the superframe. Each device within the WVAN transmits or receives required data in accordance with a contention mode through the reserved or unreserved CTB region allocated to itself, as described with reference to FIG. 4, by using information included in the beacon.

If a specific device needs to be instantly allocated with a CTB within the superframe, it transmits an instant channel resource request message (INS_CTB_REQ Command) through the region 'A' of FIG. 6 to request the coordinator instant channel resources, i.e., instant CTB within the unreserved CTB region. Table 1 illustrates an example of a format of the instant channel resource request command. Hereinafter, the terms, 'instant channel resources' or 'instant CTB' are used to identify 'channel resources' and 'CTB' allocated from the coordinator through the beacon in accordance with a general method. The terms 'instant channel resources' or 'instant CTB' may be replaced with various terms or general 'channel resources' or 'CTB.'

TABLE 1

| Octets: 1 | 1 | 1 | 1 | 1 | 2 | 2 |
|---|---|---|---|---|---|---|
| Command ID | Length = 7 | Source ID | Target ID | Usage Code | Start Limit | Instant CTB Duration |

In Table 1, a 'Command ID' field includes an identifier for identifying types of messages, and a 'Length' field includes length information of the other part of the instant channel resource request command. A 'Target ID' field includes an identifier of a device to which messages will be transmitted using requested channel resources, and a 'Source ID' field includes an identifier of a device which will transmit messages using requested channel resources. In case of the device which will transmit messages using the requested channel resources, the 'Source ID' field may include Broadcast ID before setup. A 'Usage Code' field includes an object of reservation of channel resources. A 'Start Limit' field includes timing constraint information to which channel resources should be allocated. In other words, the channel resources should be allocated within the range of the timing constraint included in the 'Start Limit' field. The 'Start Limit' field may include the fastest start timing or the latest start timing for allocating instant channel resources which are requested, or information related to both the fastest start timing and the latest start timing. For example, the instant channel resources allocated in case of the latest start timing information should not be allocated to be started at a timing point later than that indicated by the start timing information within the superframe. An 'Instant CTB duration' field includes requested channel resources, i.e., length information of a CTB duration requested for message transmission.

If there is a request for allocation of the instant channel resources, the coordinator checks whether the instant CTB can be allocated. If possible, the coordinator broadcasts an instant channel resource allocation announcement command (INS_CTB_ANC Command) from the region 'B' of FIG. 6 through the WVAN to notify allocation of the instant CTB. Table 2 illustrates an example of a data format of the instant channel resource allocation announcement command.

TABLE 2

| Octets: 1 | 1 | 1 | 1 | 1 | 2 | 2 |
|---|---|---|---|---|---|---|
| Command ID | Length = 7 | Source ID | Target ID | Usage Code | Start Offset | Instant CTB Duration |

In Table 2, a 'Target ID' field and a 'Source ID' field include the same details as those of the 'Target ID' field and the 'Source ID' field in Table 1. A 'Start Offset' field includes start location information of a CTB which is allocated. For example, the 'Start Offset' field includes information as to whether a start point of an allocated CTB starts from a point indicating how long the point is located away from a specific reference point. An 'Instant CTB Duration' field includes information of channel resources which are allocated, i.e., duration length information of an instant CTB which is allocated.

The devices within the WVAN, which have received the instant channel resource allocation message, regard the allocated instant CTB region as the reserved region. The region 'C' of FIG. 6 is an instant CTB region allocated in accordance with the above procedure, and the specific device which has requested allocation of the instant channel resources can exchange data with another device through the instant CTB region. Allocation request and allocation announcement of the instant CTB can be performed through the LRP channels. The instant CTB region includes a bandwidth duration corresponding to any one of the LRP and HRP channels. In other words, a specific bandwidth of any one of the LRP channel and the HRP channel may be used as the instant CTB region, or a specific bandwidth of both of them may be used as the instant CTB region.

Figure 7:
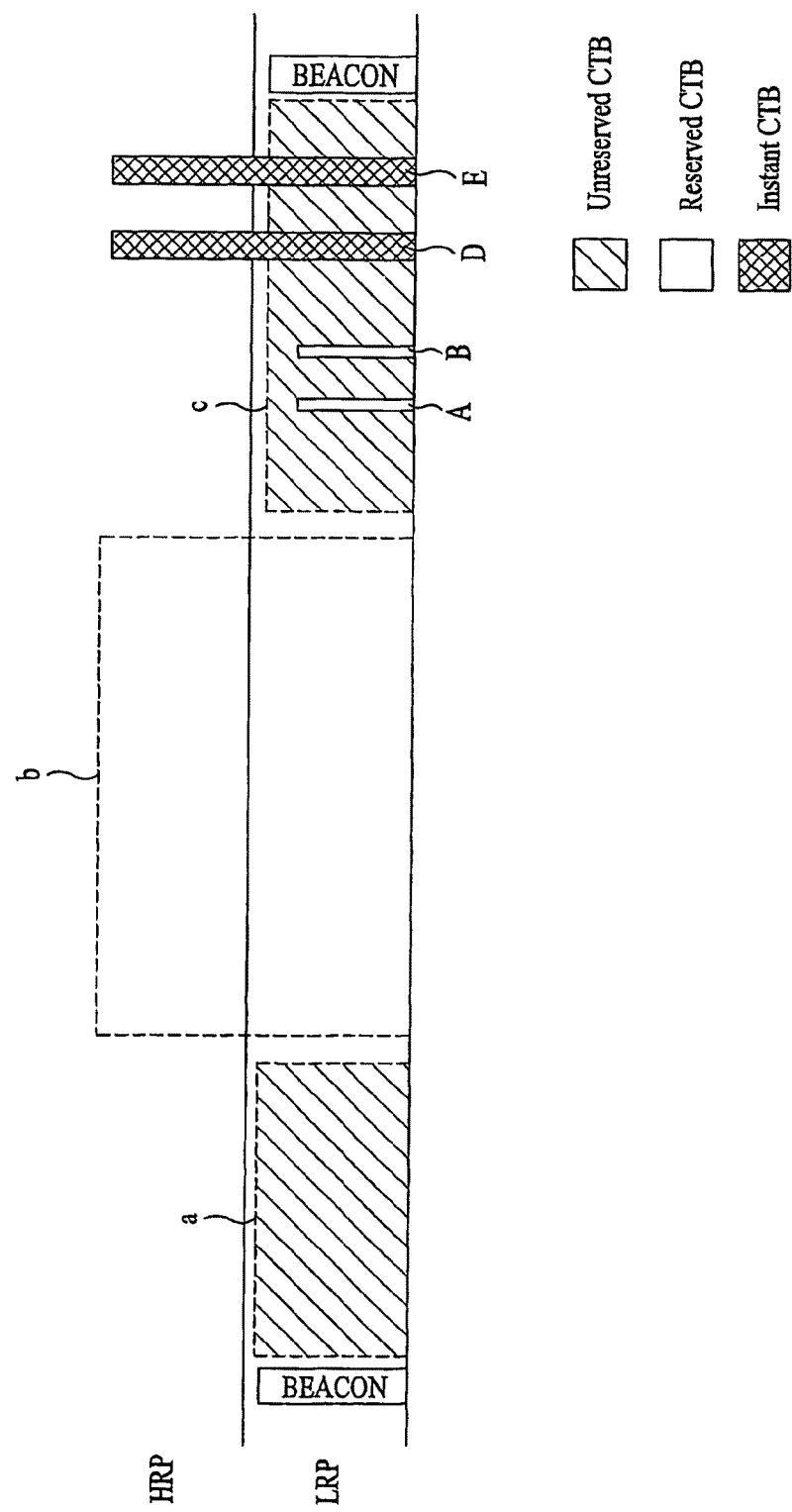
FIG. 7 illustrates an example of a structure of superframes according to another embodiment of the present invention.

FIG. 7 illustrates another example of a structure of superframes according to the embodiment of the present invention.

The embodiment of FIG. 7 is different from that of FIG. 6 in that the instant CTB region is divided into two regions ('D' and 'E'). For example, if a specific device within the WVAN instantly should transmit a message to another device and receive a response message to the transmitted message and if there is a time constraint which requires that transmission of the message and reception of the response message should be performed within a previously set time period, one instant CTB region can be allocated for transmission of the message, and another instant CTB region can be allocated for reception of the response message. The device which requests allocation of the instant CTB can transmit the instant channel resource request command to the coordinator, wherein the instant channel resource request command includes information related to an allocation request of the two divided instant CTB regions and information related to the minimum and/or maximum space between the CTB regions in addition to the information included in Table 1.

After receiving the instant channel resource request command, the coordinator checks whether instant channel resources can be allocated. If possible, the coordinator broadcasts an instant channel resource allocation announcement command shown in Table 2 through the WVAN. At this time, the 'Start Offset' field of the instant channel resource allocation announcement command includes start location information of each instant CTB region, and the 'Instant CTB duration' field includes duration length information of each instant CTB region.

Figure 8:
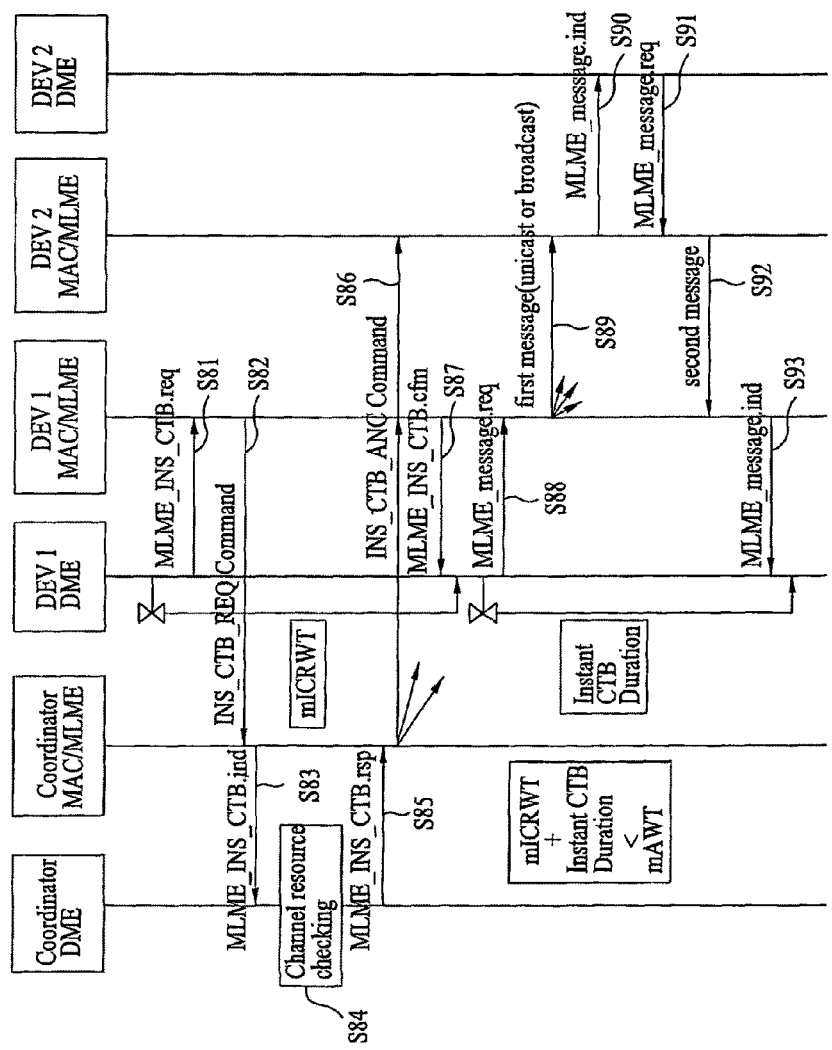
FIG. 8 is a flow chart illustrating a method of allocating instant channel resources in accordance with the embodiment of the present invention.

FIG. 8 is a flow chart illustrating a method of allocating instant channel resources in accordance with the embodiment of the present invention. In the embodiment of FIG. 8, DEV 1 is allocated with instant channel resources to transmit a first message to DEV 2 and receives a second message from the DEV 2 in response to the first message.

Referring to FIG. 8, DME of the DEV 1 forwards MLME_INS_CTB.req primitive to MAC/MLME of the DEV 1 to command a request for allocation of instant channel resources [S81], The MAC/MLME of the DEV 1 transmits an instant channel resource request message (INS_CTB_REQ Command) to the coordinator to request allocation of the instant channel resources [S82]. An example of the instant channel resource request message is the same as described with reference to Table 1. MAC/MLME of the coordinator forwards MLME_INS_CTB.ind primitive to DME of the coordinator to notify the fact that the instant channel resources have been requested from the DEV 1 [S83]. The DME of the coordinator checks channel resources within a corresponding superframe to check whether instant channel resources of the DEV 1 can be allocated to the DEV 1 [S84]. If possible, the DME of the coordinator forwards MLME_INS_CTB.rsp primitive to the MAC/MLME of the coordinator to notify the fact that the instant channel resources can be allocated to the DEV 1 [S85].

The MAC/MLME of the coordinator broadcasts an instant channel resource allocation announcement message (INS_CTB_ANC Command) to the wireless network to notify the fact that the instant channel resources have been allocated to the DEV 1 [S86]. An example of the instant channel resource allocation announcement message is the same as described with reference to Table 2. The MAC/MLME of the DEV 1 forwards MLME_INS_CTB.cfm primitive to DME of the DEV 1 to notify the fact that the instant channel resources have been allocated [S87]. The DME of the DEV 1 forwards the MLME_message.req primitive to the MAC/MLME of the DEV 1 to command the MAC/MLME of the DEV 1 to transmit the first message to the DEV 2 by using the allocated instant channel resources [S88].

The MAC/MLME of the DEV 1 transmits the first message to the DEV 2 in a unicast or broadcast mode by using the allocated instant channel resources [S89]. The MAC/MLME of the DEV 2 forwards MLME.message.ind primitive to the DME of the DEV 2 to notify reception of the first message [S90]. The DME of the DEV 2 forwards the MLME-message.req primitive to the MAC/MLME of the DEV 2 to command the MAC/MLME of the DEV 2 to transmit the second message to the DEV 1 in response to the first message [S91]. The MAC/MLME of the DEV 2 transmits the second message to the DEV 1 by using the allocated instant channel resources [S92]. The MAC/MLME of the DEV 1 forwards the MLME.message.ind primitive to the DME of the DEV 1 to notify reception of the second message [S94].

If a given time constraint is set between the transmission time and the reception time of two primitives or a specific message and a response message to the specific message in accordance with the above method, it is possible to completely ensure a process within the time constraint through allocation of the instant channel resources. For example, the transmission time and the reception time correspond to the time from a transmission timing point of MLME_INS_CT- B.req primitive from to a reception timing point of MLME_message.ind primitive in the DME of the DEV 1, the time from a transmission timing point of MLME_message.req primitive to a reception timing point of MLME_message.ind primitive in the DME of the DEV 1, or the time from a transmission timing point of the first message to a reception timing point of the second message in the MAC/MLME of the DEV 1.

In FIG. 8, 'mICRWT' means a maximum Instant CTB Request Waiting Time, and 'Instant CTB Duration' means a duration length of allocated instant channel resources. The 'Instant CTB Duration' is a value set so that the DME of the DEV 1 forwards MLME_message.req primitive to the MAC/MLME of the DEV 1 within the instant CTB duration and receives MLME_message.cfm primitive from the MAC/MLME of the DEV 1. A value obtained by adding 'mICRWT' to 'Instant CTB Duration' should be smaller than 'mAWT' which means the maximum waiting time. As the case may be, it may be set in such a manner that the first message is transmitted and the second message in response to the first message is received for the 'Instant CTB duration.' Also, like the example of FIG. 7, separate channel resources spaced apart from each other at a certain interval can be allocated for transmission of the first message and reception of the second message.

Hereinafter, the detailed embodiment to which the technical features according to the present invention have been applied will be described. In the embodiment which will be described hereinafter, the technical features of the present invention are applied to a method of transmitting and receiving a message for interfacing a high-definition multimedia interface (HDMI) network which is a kind of a wire network and a wireless video area network (WVAN) which is a kind of a wireless network (WPAN). In particular, the embodiment of the present invention relates to a method of transmitting a consumer electronics control (CEC) message from a specific device of the HDMI network to another device of the WVAN.

The HDMI is a multimedia interface which can transmit full digital audio/video data, which are not compressed. The HDMI provides a wire interface between random audio/video devices such as set-top boxes, DVD players, monitors, and digital TVs. The HDMI supports multichannel digital audio on a single cable along with improved high definition video. In other words, it means that the HDMI can transmit every ATSC HDTV and also transmit eight-channel digital audio having a sufficient bandwidth. HDMI standard document, "High-Definition Multimedia Interface Specification Version 1.2a, Dec. 14, 2005" can be referred to so as to obtain the detailed description of the HDMI.

Figure 9:
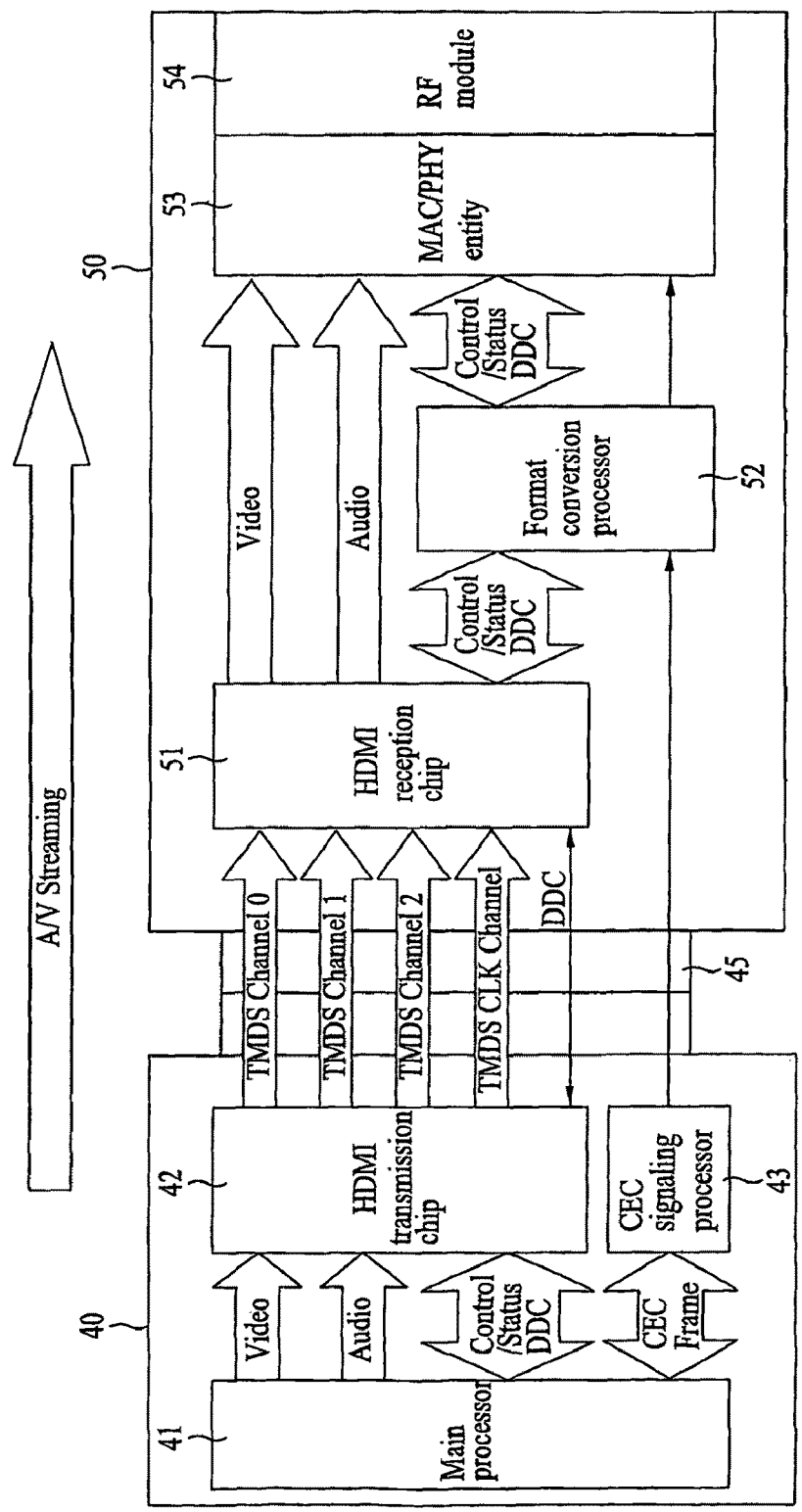
FIG. 9 is a schematic view illustrating a system according to the embodiment of the present invention.

FIG. 9 illustrates a schematic view according to the embodiment of the present invention. In FIG. 9, an HDMI device 40 and an interface device 50 are connected with each other by a connector 45. The interface device 50 receives A/V data streams and control information from the HDMI device 40 and transmits them to a specific device (not shown) of the WVAN through a wireless interface, so that the HDMI network is connected with the WVAN.

Referring to FIG. 9, the HDMI device 40 includes a main processor 41, an HDMI transmission chip 42, and a CEC signaling processor 43. The interface device 50 includes an HDMI reception chip 51, a format conversion processor 52, a MAC/PHY entity 53, and an RF module 54. Audio and video data and their assistant data transmitted from the HDMI transmission chip 42 of the HDMI device 40 are transmitted to the HDIM reception chip 51 of the interface device through three TMDS channels. In FIG. 9, a video pixel clock is transmitted through a clock channel of the TMDS channel, and the HDMI reception chip 51 uses the video pixel clock as a frequency reference signals for data recovery on the three TDMS data channels. The HDMI reception chip 51 forwards A/V streams transmitted from the HDMI transmission chip 42 to the MAC/PHY entity 53. The format conversion processor 52 converts a format of control information forwarded from the HDMI device 40 and forwards the converted format to the MAC/PHY entity 53. The MAC/PHY entity 53 processes the received data in accordance with a protocol, and the RF module 54 performs wireless signal processing, such as wireless modulation, up-converting, and signal amplification, for the received data, and transmits the processed data through an antenna (not shown).

FIG. 10A illustrates a data format of the CEC message used in the HDMI system. A CEC protocol provides a high-level control function between all kinds of visual devices under a user environment. Examples of main CEC functions include one-touch play, system standby, one-touch record, and device menu control. The HDMI standard document, "High-Definition Multimedia Interface Specification Version 1.2a, Dec. 14, 2005" can be referred to so as to obtain the details of the CEC functions.

Referring to FIG. 10A, an information bits field can include data, operation code, or address information. An end of message (EOM) bit indicates whether a corresponding bit corresponds to the end of a message, and an acknowledgement (ACK) bit is used to indicate whether a message receiving side has received data or header block. The ACK bit is set to '1' by a source device which transmits the CEC message. If a destination device successfully receives the CEC message, '0' is transmitted to the source device as an ACK signal.

FIG. 10B illustrates a data format of a header block. The header block includes EOM bit, ACK bit, an 'Initiator' field (source ID) for identifying the source device which has transmitted the CEC message, and a 'Destination field' (destination ID) for identifying a destination device which should receive the CEC message. A starting bit is located at the front of the header block. The header block may be used as a 'Ping' message for checking whether other devices are in an active state.

Figure 11:
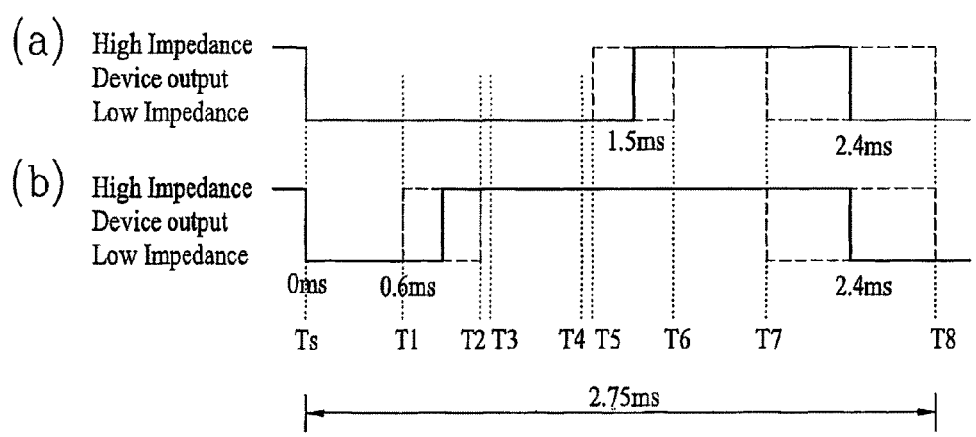
FIG. 11 illustrates a pulse format of each bit constituting a CEC message.

FIG. 11 illustrates a pulse format of each bit constituting the CEC message. In FIG. 11, (a) is a pulse format of '0' bit, and (b) is a pulse format of '1' bit. A pulse which expresses one bit has a length of 2.75 ms.

Figure 12A:
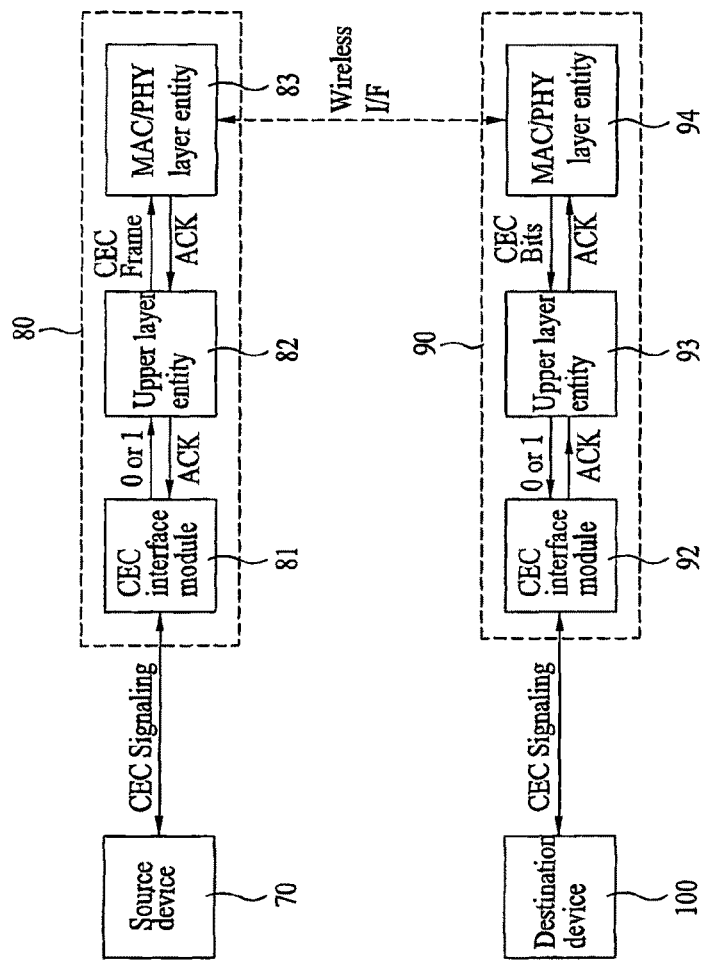
FIG. 12A illustrates a structure of a system according to the embodiment of the present invention.

FIG. 12A illustrates a structure of a system according to the embodiment of the present invention. In FIG. 12A, a source device 70 and a destination device 100 are interfaced with each other through a first interface device 80 and a second interface device 90. The first interface device 80 and the second interface device 100 may be implemented physically to form a single body with the source device 70 and the destination device 100, respectively. The first interface device 80 and the second interface device 100 may physically be separated from the source device 70 and the destination device 100, respectively, and may respectively be connected with the source device 70 and the destination device 100 through a connector. The first interface device 80 and the second interface device 100 perform communication through an air interface in accordance with WVAN protocol. The first interface device 80 includes a CEC interface (IIF) module 81, an upper layer entity 82, and a MAC/PHY layer entity 83. The second interface device 90 includes a CEC interface module 92, an upper layer entity 93, and a MAC/PHY layer entity 94.

Figure 12B:
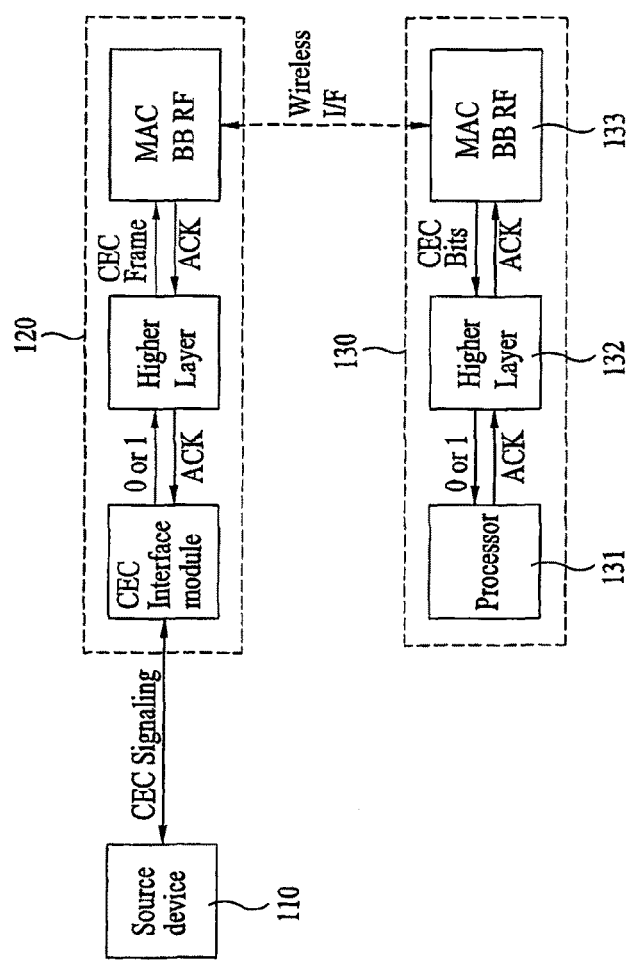
FIG. 12B illustrates a structure of another system according to the embodiment of the present invention.

FIG. 12B illustrates a structure of another system according to the embodiment of the present invention. The system according to the embodiment of FIG. 12B includes a source device 110, an interface device 120, and a destination device 130. The system according to the embodiment of FIG. 12B is different from that of FIG. 12A in that a second interface device (corresponding to 90 of FIG. 12A) has been integrated into the destination device 130. In other words, a processor 131 of the destination device 130 implements the function of the CEC IF module 92 of the second interface device 90 in the system of FIG. 12A, and an upper layer entity 132 and a MAC/PHY entity of the destination device 130 integrally implement the functions of the upper layer entity 93 and the MAC/PHY entity 94 of the second interface device 90.

Figure 13:
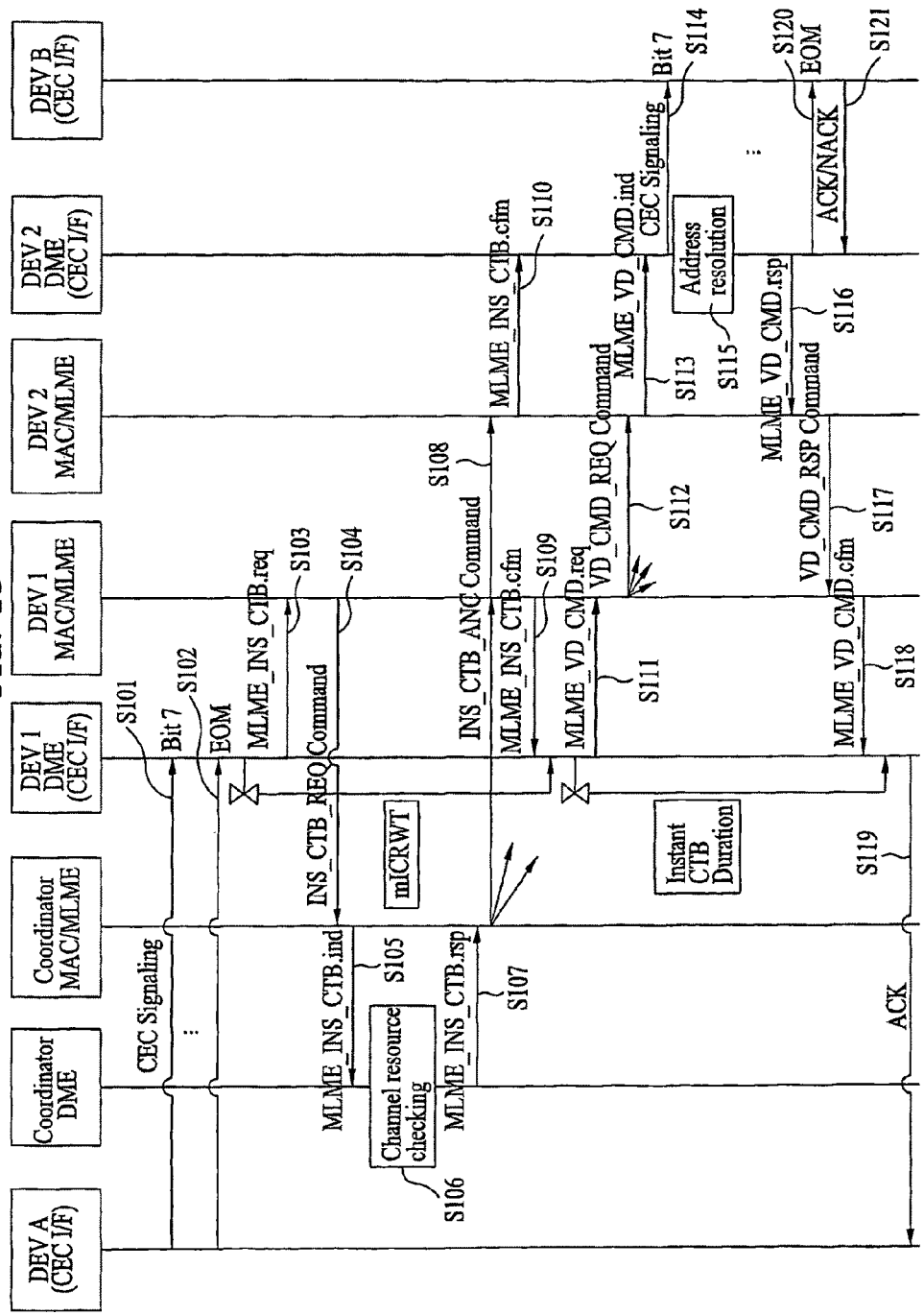
FIG. 13 is a flow chart illustrating a procedure according to the embodiment of the present invention.

FIG. 13 is a flow chart illustrating a procedure according to the embodiment of the present invention. In the embodiment of FIG. 13, the CEC message is transmitted from a source device DEV A to a destination device DEV B through the WVAN. The WVAN may include a coordinator, DEV 1, DEV 2, and other devices. The DEV 1 and the DEV 2 are interface devices, and receive the CEC message from the DEV A and forward the received CEC message to the DEV B through the WVAN. The DEV 1 and the DEV 2 forward ACK, which is transmitted from the DEV 2 in response to the CEC message, to the DEV A. To this end, the DEV 1 and the DEV 2 include a CEC I/F module. In comparison with FIG. 12A, the DEV A corresponds to the source device 70, the DEV B corresponds to the destination device 100, and the DEV 1 and the DEV 2 correspond to the first interface device 80 and the second interface device 90, respectively.

Referring to FIG. 13, the DEV A performs signaling of the CEC message to the CEC I/F module of the DEV 1 [S101~S102]. If the DEV 1 receives the EOM bit of the CEC message, the DME of the DEV 2 forwards MLME_INS_CTB.req primitive to the MAC/MLME of the DEV 1 to request allocation of channel resources [S103].

If the DEV 1 transmits a predetermined message, which includes the CEC message, to the DEV 2, the DEV 2 requires resources to transmit a response message to the predetermined message, wherein the resources mean the channel resources. Since collision may occur if the DEV 2 transmits the response message in accordance with a contention based method without allocating separate channel resources, it is preferable that the DEV 2 is allocated with channel resources in advance. It is preferable that request and allocation of the channel resources are instantly performed within a corresponding superframe in accordance with the method described with reference to FIG. 7 or FIG. 8. In other words, if the channel resources are allocated in accordance with a general method, an arrival time limit of ACK/NACK in response to the CEC message of 2.75 ms may pass. Accordingly, allocation of channel resources is requested from the DEV 1 within a corresponding superframe, and the coordinator allocates channel resources, i.e., several unreserved CTBs within the corresponding superframe.

The MAC/MLME of the DEV 1 transmits the instant channel resource request message (INS_CTB_REQ Command) shown in Table 1 to the MAC/MLME of the coordinator to request allocation of the channel resources [S104]. The MAC/MLME of the coordinator forwards MLME_INS_CTB.ind primitive of the coordinator to notify that the channel resources have been requested from the DEV 1 [S105]. In response to the request of channel resources, the DME of the coordinator checks whether there are channel resources to be allocated [S106].

If there are channel resources to be allocated, the DME of the coordinator forwards MLME_INS_CTB.rsp primitive to the MAC/MLME of the coordinator to command the MAC/MLME of the coordinator to transmit information of channel resources, which are to be allocated, to the devices of the WVAN [S107]. The MAC/MLME of the coordinator broadcasts the instant channel resource announcement message (INS_CTB_ANC Command) illustrated in Table 2 through the WVAN to notify the devices of the WVAN of information of the channel resources which are to be allocated [S108].

The MAC/MLME of the devices of the WVAN including the DEV 1 and the DEV 2 forwards MLME_INS_CTB.cfm primitive to the DME to notify the fact of allocation of the channel resources [S109, S110].

The DME of the DEV 1 forwards MLMEVD_CMD.req primitive to the MAC/MLME of the DEV 1 to command the MAC/MLME of the DEV 1 to transmit the CEC message to the DEV 2 [S111]. The MAC/MLME of the DEV 1 constitutes a vendor specific request message (VD_CMD_REQ Command) which includes the CEC message, and broadcasts the vendor specific request message through the WVAN [S112]. Table 3 illustrates an example of a data format of the vendor specific request message.

TABLE 3

| Octets: 1 | 1          | 3          | n                    |
|-----------|------------|------------|----------------------|
| 0xFC      | Length = n + 3 | Vendor OUI | Vendor Specific Data |

In table 3, a 'Vendor OUI' field includes information of vendor OUI (Organizational Unique Identifier) information, and a 'Vendor Specification Data' field includes a message which is to be forwarded, i.e., the CEC message in FIG. 13. The 'Vendor Specification Data' field may include a message or control information, which is not defined in WiHD standard document. At this time, data may be included in the 'Vendor Specification Data' byte unit. For example, the CEC message includes 1 byte from bit 7 to bit 0, and then may additionally include bit information indicating EOM.

As another embodiment, the MAC/MLME of the DEV 1 can directly broadcast the message or control information, which is not defined by the WiHD standard document, i.e., the CEC message through the WVAN without including the message in the vendor specific request message (VD_CMD_REQ Command). In this case, a packet may be constituted in a byte unit and then broadcasted.

The MAC/MLME of the DEV 2 forwards MLMEVD_CMD.ind primitive to the DME of the DEV 2 to notify that the vendor specific request message has been received [S113].

The CEC I/F module of the DEV 2 starts signaling of the CEC message included in the vendor specific request message to forward the CEC message to HDMI devices connected with the DEV 2 [S114]. The DEV 2 performs an address resolution procedure after starting signaling of the CEC message [S115]. In other words, the DEV 2 checks, through the address resolution procedure, whether there is a destination device, i.e., DEV B, to which the CEC message is to be forwarded, among the HDMI devices connected with the DEV 2.

If the DME of the DEV 2 checks, through the address resolution procedure, that the DEV B has been connected with the DEV 2, the DEV 2 transmits ACK signal to the CEC message to the DEV 1 even before ending signaling of the CEC message. In other words, the MAC/MLME of the DEV 2 constitutes the vendor specific request response message (VD_CMD_RSP Command) which includes ACK in response to the CEC message, and transmits the vendor specific request response message to the DEV 1 [S117]. Table 4 illustrates an example of a data format of the vendor specific request response message.

TABLE 4

| Octets: 1 | 1 | 3 | 1 |
|---|---|---|---|
| 0xFD | Length = 4 | Vendor OUI | Error Reason Code |

If the DME of the DEV 2 identifies, through the address resolution procedure, that the DEV B has not been connected with the DEV 2, the DME may end forwarding of the CEC message.

The vendor specific request response message is transmitted through the channel resources allocated in the steps S104~S108 for allocation of the channel resources. The MAC/MLME of the DEV 1 forwards MLME_VD_CMD.cfm primitive to the DME of the DEV 1 to notify the fact that the vendor specific request response message has been received [S118]. The CEC I/F module of the DEV 1 transmits ACK to the DEV A based on the vendor specific request response message [S119].

After receiving the EOM bit of the CEC message [S120], the DEV B transmits ACK or NACK to the DEV 2 depending on the presence of receiving error [S121]. If the DEV 2 receives ACK from the DEV B, transmission of the CEC message ends. However, if the DEV 2 receives NACK, the DEV 2 should re-transmit the CEC message to the DEV B.

In FIG. 13, 'mICRWT' means a maximum Instant CTB Request Waiting Time, and 'Instant CTB Duration' means a waiting time set such that the DME of the DEV 1 forwards MLMEVD_CMD.req primitive to the MAC/MLME of the DEV 1 and receives MLMEVD_CMD.cfm primitive from the MAC/MLME of the DEV 1. A value obtained by adding 'mICRWT' to 'Instant CTB Duration' should be smaller than 'mAWT' which means the maximum ACK/NACK waiting time. The CEC message has 'mAWT' of 2.75 ms.

Terminologies used herein may be replaced with other terminologies. For example, the device may be replaced with a user device (or apparatus) or station, the coordinator may be replaced with a coordinating apparatus (or control apparatus), a coordinating device (or control device), a coordinating station (or control station), or piconet coordinator (PNC).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, it may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, the following advantages can be obtained.

First of all, it is possible to instantly allocate the channel resources if necessary even under the circumstances that the channel resources are already allocated.

In addition, delay in message transmission between the wire network and the wireless network or between two devices can be avoided, whereby desirable communication can be performed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless network system.

The invention claimed is:

1. A method of allocating a channel resource at a first device in a wireless network, the method comprising:
    transmitting a message for requesting the channel resource from the first device to a coordinator, wherein the channel resource is to be used for both transmitting a first message from the first device to a second device and receiving a second message from the second device in response to the first message, wherein the message for requesting the channel resource includes information about a duration of the channel resource;
    receiving, by the first device, channel resource allocation information for allocating the channel resource, wherein the channel resource allocation information comprises information about a duration of the allocated channel resource;
    transmitting the first message from the first device to the second device during the channel resource allocated based upon the channel resource allocation information;
    receiving the second message from the second device in response to the first message during the allocated channel resource; and
    receiving a primitive requesting to transmit the message for requesting the channel resource at a MAC/MLME sublayer of the first device from an upper sublayer of the first device,
    wherein the MAC/MLME sublayer of the first device transmits the message for requesting the channel resource to a MAC/MLME sublayer of the coordinator.

2. The method of claim 1, wherein the first device receives the channel resource allocation information for allocating the channel resource that is broadcasted by the coordinator in response to the message for requesting the channel resource.

3. The method of claim 1, wherein the message for requesting the channel resource is not the same as the first message.

4. A method of allocating a channel resource at a coordinator in a wireless network, the method comprising:

receiving from a first device a message for requesting the channel resource, wherein the message for requesting the channel resource includes information about a duration of the channel resource; and broadcasting channel resource allocation information for allocating the channel resource, wherein the channel resource allocation information comprises information about a duration of the allocated channel resource, wherein the channel resource is to be used by the first device for both transmitting a first message from the first device to a second device and receiving a second message from the second device in response to the first message;

wherein a MAC/MLME sublayer of the first device receives a primitive requesting to transmit the message for requesting the channel resource from an upper sublayer of the first device;

wherein a MAC/MLME sublayer of the coordinator receives the message for requesting the channel resource from the MAC/MLME sublayer of the first device.

5. The method of claim 4, wherein the first device receives the channel resource allocation information for allocating the channel resource that is broadcasted by the coordinator in response to the message for requesting the channel resource.

6. The method of claim 4, wherein the message for requesting the channel resource is not the same as the first message.

* * * * *